United States Patent [19]

Hada

[11] 4,242,423
[45] Dec. 30, 1980

[54] OPTICAL-CHARGING TYPE HALF-CELL, AND PHOTOCHEMICAL BATTERY USING THE SAME

[75] Inventor: Hiroshi Hada, Ootsu, Japan

[73] Assignee: Fuji Photo Film Co., Ltd., Minami-ashigara, Japan

[21] Appl. No.: 41,469

[22] Filed: May 22, 1979

[30] Foreign Application Priority Data

May 26, 1978 [JP] Japan .................................. 53-62939

[51] Int. Cl.³ .......................... H01M 6/30; H01M 6/36
[52] U.S. Cl. ..................................................... 429/111
[58] Field of Search ................. 429/111; 204/DIG. 3, 204/290 R, 254, 268

[56] References Cited

U.S. PATENT DOCUMENTS

| 4,011,149 | 3/1977 | Nozik | 204/129 |
| 4,084,044 | 4/1978 | Heller et al. | 429/111 |
| 4,094,751 | 6/1978 | Nozik | 204/80 |
| 4,128,704 | 12/1978 | McKinzie et al. | 429/111 |
| 4,144,139 | 3/1979 | Durkee | 204/15 |

OTHER PUBLICATIONS

A. J. Nozik, "Photochemical Diodes", *Appl. Phys. Lett.*, vol. 30, pp. 567–569 (1977).
A. J. Band, "Photoelectrochemistry & Heterogeneons Photocatalysis At Semiconductors," *J. Photochem.*, vol. 10, pp. 67–69 (1979).

*Primary Examiner*—Aaron Weisstuch
*Attorney, Agent, or Firm*—Sughrue, Rothwell, Mion, Zinn and Macpeak

[57] ABSTRACT

A changeable optical energy charging type half cell which essentially comprises a metal electrode with a lead wire, and a thin plate of photoactive-semiconductor in contact with the metal electrode. The metal electrode and thin plate are immersed in an electrolyte containing metal ions from which metal is deposited. The thus constituted half cell is used to form a photochemical battery incorporating an oxidation-reduction system half-cell. The two half-cells are connected to each other through a material which does not interrupt the movement of ions therebetween.

13 Claims, 5 Drawing Figures

OPTICAL-CHARGING TYPE HALF-CELL, AND PHOTOCHEMICAL BATTERY USING THE SAME

BACKGROUND OF THE INVENTION

This invention relates to energy-charging type half-cells in which optical energy can be efficiently stored, and the energy thus stored can be efficiently obtained as electrical energy. More particularly it relates to a rechargeable optical energy charging type half-cell in which an energy storage stage can be efficiently obtained by application of light after discharge. The invention also relates to a photochemical battery which is obtained by combining the optical energy charging type half-cell and an oxidation-reduction system half-cell.

Recently, the conversion of sunlight energy into electrical energy has been the subject of many studies. As a result of these studies, a so-called photochemical battery has been provided in accordance with a method in which a photochemical reaction is utilized, and the energy of the resultant chemical change is obtained as electrical energy. Since the photochemical battery is manufactured at a relatively low cost, it is expected to be put in practical use when designs are optimized.

In order to provide a photochemical battery of high performance, the following requirements must be satisfied: (1) the photochemical reaction to be utilized is endothermic with high quantum yield (at least 20 percent) (2) a material produced by the photochemical reaction can be stored so that it can be obtained as electrical energy later on; (3) and after the electrical energy is obtained through discharge, the storage state can be obtained again by applying light (i.e., optical energy recharging is possible). It is advantageous that the energy be stored as compactly as possible. Accordingly, it be desirable that the energy is stored in a solid phase.

One of the photochemical cells which are important in view of the above-described requirements is an optical energy rechargeable galvanic cell which is obtained by combining silver chloride and an oxidation-reduction system. It is disclosed in "Journal of the Electrochemical Society," vol. 42, page 108 (1961).

In this photochemical cell, a metal electrode is covered with silver chloride, light is applied to the silver chloride electrode immersed in an aqueous solution containing $Fe^{2+}$ ions to deposit silver, and the silver thus deposited is employed as the negative electrode while a platinum electrode is employed as the positive electrode to cause discharge to thereby obtain electrical energy. This photochemical cell is advantageous in that energy storage can be reaccomplished by applying light thereto after discharge. The energy storage is carried out by silver trapped in the AgCl lattice defects, which leads to the provision of a compact cell. However, it is still disadvantageous in that self-discharge occurs during periods of non-use, and the quantum yield of photo-decomposition is low (of the order of 2%). Thus, the amount of photo-decomposed silver is reduced by self recharge and, the amount of energy storage (charge) is reduced.

U.S. Pat. No. 3,114,658 discloses a method where a sheet of AgCl is employed as a film adapted to separate the positive pole from the negative pole in order to prevent the self-discharge of the above-described photochemical cell. However, this method cannot overcome drawbacks other than self-discharge.

SUMMARY OF THE INVENTION

Accordingly, an object of this invention is to provide an optical energy rechargeable type half-cell which has high efficiency of optical energy storage and high efficiency of optical recharging.

Another object of the invention is to provide an energy charging type half-cell which can store a large amount of optical energy.

A further object of the invention is to provide a photochemical battery using an optical energy charging type half-cell.

The foregoing and other objects of the invention have been achieved by the provision of a rechargeable optical energy charging type half cell comprising essentially a metal electrode with a lead wire, and a thin plate of photoactive-semiconductor in contact with the metal electrode. The metal electrode and thin plate are immersed in an electrolyte containing metal ions from which metal is deposited. A photochemical battery comprises such a rechargeable optical energy-charging type half cell and an oxidation-reduction system half-cell. The two half-cells are connected to each other through a material which does not interrupt the movement of ions therebetween.

This invention will be described with respect to the Brief Description of Drawings and the Description of the Preferred Embodiments that follow.

DESCRIPTION OF THE PREFERRED EMBODIMENTS

Figure 1:
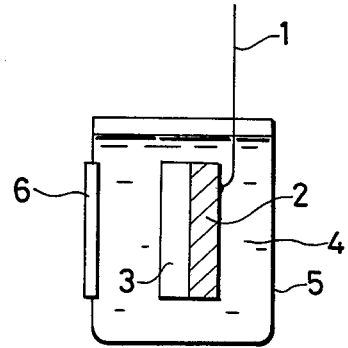
FIG. 1 is an explanatory diagram showing a rechargeable optical energy charging type half-cell according to this invention.

An optical energy charging type half-cell according to this invention is as shown in FIG. 1. A thin plate 3 of photoactive semiconductor is in contact with a metal electrode 2 to which a lead wire 1 is connected, for instance, by soldering. This thin plate 3 is immersed in an electrolyte 4 containing metal ions which can deposit metal when the photoactive semiconductor subjected to optical excitation.

The thin plate 3 of photoactive semiconductor is manufactured according to various methods. For instance, it is obtained by cutting a single crystal or a ribbon crystal of semiconductor. Alternatively, powdered semiconductor is molded under pressure and then sintered to obtain the thin plate 3. In another method, powdered semiconductor is dispersed in a binding agent to form a film. However, it is best to form the thin plate 3 in accordance with the sintering method. The size and thickness of the thin plate is suitably changed according to the use of the half-cell of the invention.

In this invention, the term "photoactive-semiconductor" is intended to mean a substance which is excited by optical irradiation to create photons. Such substances are, for instance; $TiO_2$, $ZnO$, $SnO_2$, $V_2O_5$, $Fe_2O_3$, $SrTiO_3$, $CaTiO_3$, $CdS$, $SiC$, $GaP$, $GaAs$, $CdSe$ and $CdTe$. Among these substances, n-type oxide semiconductors are most suitable.

The metal electrode 2 is in ohmic contact with the thin plate 3 of photo-semiconductor. When light is applied to the thin plate 3 of photo-semiconductor, the metal electrode 2 can be positioned to be in contact with metal deposited on the thin photoactive-semiconductor plate. However, when light is applied to the metal electrode 2, it is necessary to make the metal electrode 2 substantially transparent with respect to light of the photoactive-semiconductor's excitation wavelength by decreasing the area of the metal electrode 2 covering the thin plate 3 of photoactive-semiconductor, or by modifying the metal electrode 2 to be the form of a mesh or screen, or by decreasing its thickness.

The metal electrode 2 can be brought into contact with the thin plate 3 by various methods. For instance, a layer of metal usable as the metal electrode 2 may be formed on the surface of the thin plate by vacuum evaporation, sputtering, ion plating, or electroless plating. Alternatively, a layer of photoactive-semiconductor may be formed on the metal electrode 2 by the above-described various methods. Among metals which can be employed as the metal electrode, a metal whose oxide can be used as the photo-semiconductor is selected. The surface of a plate of this metal is oxidized by using a fuel gas such as natural gas thereby forming a film of photoactive-semiconductor on the metal plate.

Furthermore, in another method, a thin plate of photo-semiconductor is immersed in a liquid containing ions of the metal used as the metal electrode 2, and light is applied thereto, so that the metal is deposited on the surface of the photo-semiconductor. Then it is covered with a protective film [described later] and used as the metal electrode 2.

There are a variety of metals which can form the metal electrode 2. For instance, these metals are Au, Ag, Cu, Pb, Sn, Ni, Co, In, Cd, Fe, Ga, Cr, Zn, Mn, Zr, Ti, and Al.

Figure 2:
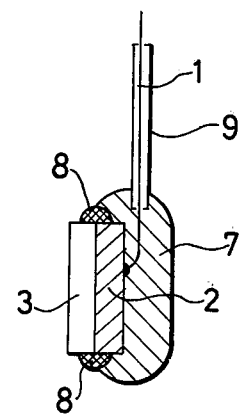
FIG. 2 is a sectional view of one example of an electrode employed in the optical energy charging type half-cell according to the invention.

If, among these materials, a metal whose ionization potential is equal to or greater than that of metal ions contained in the electrolyte 4 (described later) is used to form the metal electrode, no particular special configuration is required. However, if a metal whose ionization tendency is lower than that of the aforementioned metal ions is used, the electrode 2 must be covered with a protective cover 7 as shown in FIG. 2 in order to prevent the material of the metal electrode 2 from being dissolved in the electrolyte 4. More specifically, as shown in FIG. 2, an auxiliary metal electrode 8 made of metal whose ionization potential is equal to or higher than that of the metal ions is provided in such a manner that it is in contact with both the metal electrode 2 and the thin plate 3 of photoactive-semiconductor. Then the metal electrode 2 is covered with the protective cover 7.

In this arrangement, the auxiliary metal electrode 8 is in contact with the electrolyte 4. Therefore, metal deposited by optical charging (described later) is brought in electrical contact with the metal electrode 2 through the auxiliary metal electrode 8. The auxiliary metal electrode 8 is provided in such a manner that it is in contact with both the metal electrode 2 and the thin plate of photoactive-semiconductor at least at the junction thereof.

The auxiliary metal electrode 8 may be provided according to the various methods employed for providing the metal electrode. However, it is preferable that the auxiliary metal electrode 8 be provided according with the following method, because optical charging can be simultaneously carried out.

The assembly comprising the metal electrode 2 and the thin plate 3 is immersed in the aqueous solution of metal ions which can deposit metal upon subjecting the photoactive-semiconductor to optical excitation. Then light is applied to the assembly to deposit the metal, through the reduction of the metal ions. This operation is repeatedly carried out until the metal deposited on the thin plate 3 of photoactive-semiconductor is directly in contact with the metal electrode 2. Of the metal thus deposited, only the metal deposited at the junction of the thin plate 3 and the metal electrode 2 is used as the auxiliary metal electrode. The metal deposited on the thin plate 3 of photoactive-semiconductor may be used to collect electrical energy. The termination of this operation can be confirmed by detecting when the resistance between the metal deposited on the photoactive-semiconductor and the conductor 1 is of the order of 10 $\Omega$.

The protective cover 7 of the metal electrode 2 is made of resin or glass which is insoluble in the electrolyte 4. It is sufficient that the protective cover 7 cover the metal electrode 2 only. However, in the case where the conductor 1 may be dissolved in the electrolyte 4, it is preferable that the conductor 1 also be covered with a protective cover 9.

The metal ions which are contained in the electrolyte 4 of the optical energy charging type half-cell according to the invention and can deposit metal in response to the optical excitation of the photoactive-semiconductor are, for instance, $Ag^+$, $Fe^{3+}$, $Fe^{2+}$, $Cu^{2+}$, $Cu^+$, $Hg^+$ and $Au^+$. These metal ions are introduced into the electrolyte by adding salts thereof into the liquid. Accordingly, it is desirable that the metallic salt be high in solubility. In general, a salt whose solubility with respect to water at 20° C. is higher than 0.03 mol/l is usable. These salts are, for instance, $AgNO_3$, $AgClO_4$, $FeCl_3$, $Fe(NO_3)_2$, $Cu(ClO_3)_2$, and $Hg_2(ClO_4)_2$. The amount of metallic salt to be added to the electrode liquid is not critical in this invention: however, it is, in general, in the range of from 0.03 N to 3 N.

Fundamentally, the electrolyte 4 is prepared by using the above-described metal ions and water; however, it is preferable that a supporting electrolyte comprising a salt be added thereto. Metallic salts lower in standard oxidation-reduction potential than the salts of the above-described metal ions, or strong acids such as hydrochloric acid and sulfuric acid, or ammonium salt such as $(NH_4)_2SO_4$ are used as the supporting electrolytes. The amount of supporting electrolyte to be added is greater than that of the used metal ions, being normally 0.1–10 N in concentration. The supporting electrolyte is unnecessary for charging the half-cell according to the invention; however, it is effective for providing electrical energy when using the half-cell.

A suitable buffer solution may be added to the electrolyte 4. The buffer solution is, for instance, Clark-Lubs buffer solution, Kolthoff buffer solution, Walpole buffer solution, Menzel buffer solution, McIlvaine buffer solution, Michaelis buffer solution, or Britton-Robinson buffer solution.

Referring back to FIG. 1, reference numeral 5 designates a container accommodating the half-cell described above. It is preferable that the wall of the container be transparent with respect to the photo-semiconductor exciting wavelength light; however, if a window 6 for applying light is provided in the wall, then the remaining part of the wall may be opaque.

In the optical energy charging type half-cell thus constructed according to the invention, the optical energy is stored in the form of deposited metal by utilizing the phenomenon that the metal ions of the electrolyte are reduced into metal by optical excitation of the photo-semiconductor. It is considered that the phenomenon occurs when electrons created by the optical excitation of the photo-semiconductor reduce the metal ions. In this case, holes are created simultaneously, and the holes thus created move from the interface between the photoactive-semiconductor and the electrolyte into the electrolyte. Accordingly, in the half-cell according to the invention, the following reaction occurs:

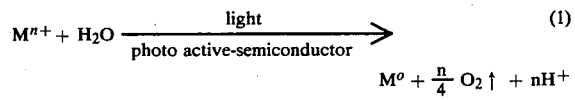

$$M^{n+} + H_2O \xrightarrow[\text{photo active-semiconductor}]{\text{light}} M^o + \frac{n}{4} O_2 \uparrow + nH^+ \quad (1)$$

where, $M^{n+}$ are the metal ions having a positive valance of n, and $M^o$ is the metal deposited by light application. This is the step of optical charging in this invention.

The metal ions in the electrode liquid 4 are deposited as metal on the thin plate 3 of photoactive-semiconductor and the metal electrode 2 by the application of light (in the case where the metal electrode 2 is covered with the protective cover, the metal is deposited on the thin plate only). In order to obtain electrical energy from the half-cell, it is necessary that the deposited metal be in contact with the metal electrode 2 directly or through the auxiliary metal electrode 8. In other words, the deposited metal which can be brought in contact with the metal electrode in this manner can contribute to optical charging and discharging.

In the optical energy charging type half-cell according to the invention, optical energy higher than the forbidden band of the photoactive-semiconductor used is stored in the form of deposited metal, and the optical energy thus stored is converted into electrical energy. If the photoactive-semiconductor is subjected to spectral sensitization by using a sensitizing dye, low energy light also can be utilized. If various sensitizing dyes are used in combination, then, it is then possible to make the half-cell sensitive to the entire visible region of sunlight.

Figure 3:
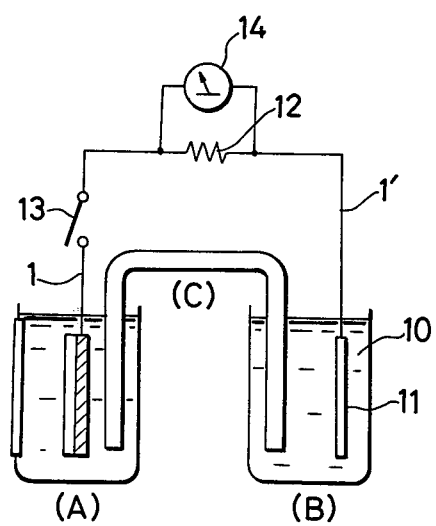
FIG. 3 is an explanatory diagram showing a photochemical battery according to the invention.

The optical energy thus stored is obtained as electrical energy by a photochemical battery according to the invention. One example of the photochemical battery is shown in FIG. 3. The half-cell (A) according to the invention is coupled to a half-cell (B) utilizing an oxidation-reduction system through a material (C) which does not interrupt the movement of ions between the half-cells. The lead wire 1 of half-cell (A) is connected to lead wire 1' of half-cell (B) through a load 12 and switch 13.

In this photochemical battery, the half-cell (A) charged as described above serves as the positive pole. More specifically, when the switch 13 is closed, oxidation of the previously deposited metal occurs in the half-cell (A) of the invention, while a reduction reaction occurs in the half-cell (B) of the opposite pole. Current flows through the load as a result of the difference in electromotive force between the two half-cells. This is the step of discharging in this invention.

Accordingly, it is necessary to use for the half-cell (B) forming the photochemical battery an oxidation-reduction system which carries out a reduction reaction at a standard oxidation-reduction potential higher than the standard oxidation-reduction potential of the reaction (metal⇌metal ions+electrons) in the half-cell (A) of the invention. The higher the standard oxidation-reduction potential of the oxidation-reduction system, the better the result is that obtained. The preferable oxidation-reduction systems in the invention are, for instance, $Ce^{4+}/Ce^{3+}$, $Co^{3+}/Co^{2+}$, $MnO_4^-$(acidic)/$MnO_2$ or $O_2$(acidic)/$H_2O$.

The half-cell (B) can be formed as follows: An electrolyte 10 is prepared by adding an oxidized material and a reduced material chosen from the above-described oxidation-reduction systems to the above-described aqueous solution of electrolyte. Then, an electrolyte 11 is immersed in the electrode 10 thus prepared. The amounts of oxidized and reduced materials are optional; however, it is preferable that a sufficient amount of oxidized material be used. The electrode 11 may be a bar or plate made of Pt, Ag or carbon. The above-described buffer liquid may be added to the electrolyte 10.

The material which couples the electrolyte 10 in the half-cell of the oxidation-reduction system (B) to the electrolyte 4 in the half-cell (A) of the invention and which does not interrupt the movement of ions therebetween is, for instance, a salt bridge, a porous chip, a glass frit, or an ion exchange membrane.

In half-cell (B), during the discharging operation, the oxidized material is converted into the reduced material, and therefore the amount of oxidized material is gradually decreased. Therefore, it is necessary to additionally supply the oxidized material after the battery is discharged to a certain extent. However, it should be noted that the timing of supplying the oxidized material and the amount of oxidized material to be supplied depend on the nature of the oxidation-reduction system of half-cell (B).

In the above-described photochemical battery, during the discharging operation, the deposited metal is oxidized and dissolved as metal ions in the electrode liquid 4 in the half-cell (A). The discharging operation is continued until the deposited metal is disconnected from the metal electrode 2 or the auxiliary metal electrode 8 by the dissolution. After the discharging operation, a sufficient amount of metal ions, which can be reduced into metal by the application of light to the photoactive-semiconductor, will again be provided in electrode liquid 4 of the half-cell (A) of the invention.

Accordingly, if the switch 13 is opened after the discharging operation and light is applied to the thin plate 3 of photoactive-semiconductor, the metal ions are again reduced into solid metal. As a result the battery is again placed in the optically charged state. The cycle of "optical charge"—"discharge"—"optical recharge'-'—"discharge" can be repeatedly carried out. The light for the initial optical charging and the light for the following optical charging (optical recharge) may be obtained from one and the same optical source, or may be obtained from different optical sources.

As is apparent from the above description, in the half-cell and the photochemical battery according to the invention, optical energy is stored in a solid phase, e.g., in the form of photo-electrochemically deposited metal. Accordingly, the device for storing the optical energy can be made compact. At the time of the storage (charging) or the optical recharging, the metal deposition is carried out without transporting the charges (electrons and holes) away from the photoactive-semiconductor. Therefore, its quantum yield is very high (for instance, being more than 50% with silver ions as the metal ions). At the time of discharging, the current flows from the deposited metal directly to the lead wire without passing through the photoactive-semiconductor, and therefore the internal resistance is low. After the discharging operation, the charged state is obtained again by applying light. Thus, optical energy can be repeatedly converted into electrical energy.

As is clear from the above description, the half-cell and the photochemical battery according to the invention advantageously provide a variety of merits.

This invention will be described in more detail with reference to the following example.

EXAMPLE

I. Manufacture of the Optical-Energy Recharging Type Half-Cell

About 1 g of rutile type titanium dioxide (made by Sakai Kagaku Co.) was molded under a pressure of 200 Kg/cm$^2$, and was sintered at 1300° C. in air for two hours, to obtain a thin plate of titanium dioxide, 2 mm in thickness and 1 cm$^2$ in surface area (its electrical resistance being higher than $10^6$ Ω in the dark). Then, a layer of indium was formed on one surface of the thin plate by vacuum evaporation, at a vacuum of $10^{-4}$ Torr and a temperature of 200° C., the thickness of the indium layer being about 5000 Å. Then, a copper wire was soldered to the indium layer.

The thin plate thus treated (hereinafter referred to as "a plate assembly") was immersed in a silver nitrate solution of 0.1 N to provide the auxiliary metal electrode. After being removed from the solution, the thin plate was placed directly under sunlight for thirty minutes. This operation was repeated five times. As a result, silver was deposited on the surface of the plate assembly. Since the electrical resistance between the silver deposited on the titanium dioxide plate and the copper wire was five ohms (Ω), it was confirmed that the silver deposited on the titanium dioxide plate is in direct contact with the indium layer. Then the plate assembly was washed with distilled water. After the copper wire was inserted into a Pyrex tube, the indium layer and the silver deposited at the junction of the indium layer and the titanium dioxide plate were completely covered with an epoxy resin [Araldite Standard (registered name) produced by Ciba Geigy AG], as shown in FIG. 2.

The electrode thus formed was immersed in electrolyte 100 ml of electrolyte 0.1 N with respect to silver nitrate and 1 N with respect to potassium nitrate in a Pyrex brand glass container. Thus, a charged optical-energy type half-cell was obtained.

II. Assemblying of the Photochemical Battery

An oxidation-reduction system half-cell was used, which was obtained by inserting a platinum electrode into an electrolyte 1 N with respect to potassium nitrate and 0.05 N with respect to both cerium sulfate (IV) and cerium sulfate (III). The electrolyte of this oxidation-reduction system half-cell was connected through a salt bridge to the electrolyte of the above-described optical-energy rechargeable type half-cell as shown in FIG. 3. Both of the half-cells were placed in a thermostatic oven at 24° C. The two electrodes were connected to each other through a 30 Ω load and a switch. A volt meter was connected in parallel to the load as shown in FIG. 3.

The photochemical battery thus formed can be represented by the following formula:

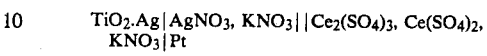

III. Discharging

When the switch of the photochemical battery described above was closed, current flowed. Therefore, it could be confirmed that optical energy was converted into electrical energy. The relation between discharging current and output voltage was as indicated by curve 1 in FIG. 4.

The discharging was continued with the switch closed. It was found, as indicated by curve 1 in FIG. 5, that the discharging current decreased with discharging time, but a current of about $3.4 \times 10^{-4}$ A/cm$^2$ was obtained after 1.5 hours. After the discharging was continued for 1.5 hours, the relation between discharging current and output voltage was as indicated by curve 1' in FIG. 4.

IV. Optical Recharging of the Electrode

After the discharging was continued for 1.5 hours, the switch was opened, and the optical-energy rechargeable type half-cell was placed under sunlight for about thirty minutes. Thereafter, the above-described battery was assembled and the switch was closed, to investigate the relation between discharging current and output voltage and the relation between discharging current and discharging time before and after discharge. The results thereof were as indicated by curve 2 (before discharge) and curve 2' (after 1.5 hrs. discharge) in FIG. 4 and curve 2 in FIG. 5.

Figure 4:
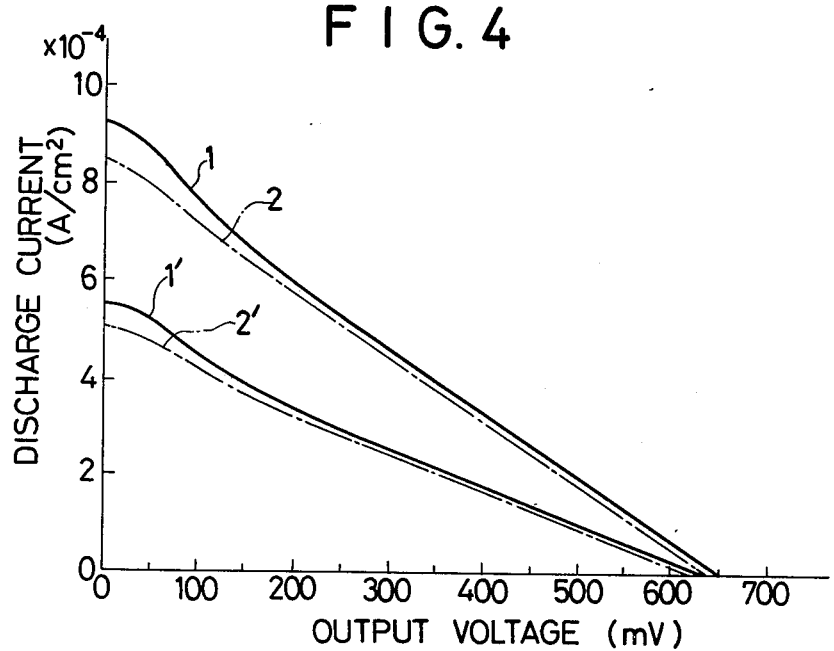
FIG. 4 is a graphical representation indicating the relation between discharging current and output voltage of one example of the photochemical battery according to the invention.
Figure 5:
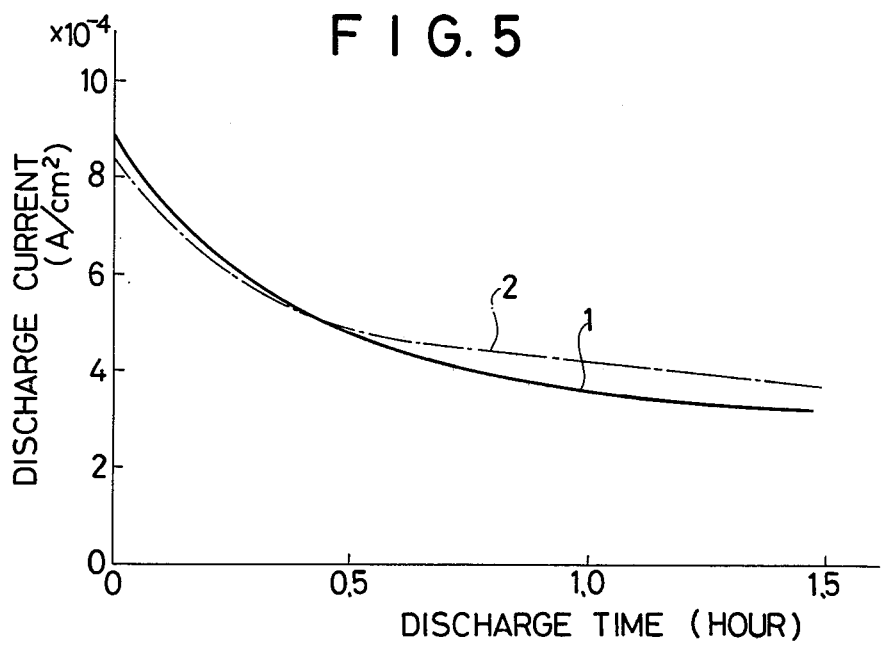
FIG. 5 is a graphical representation indicating the relation between discharging current and discharging time of the photochemical battery.

As is apparent from comparison between the curves 1 and 1', and 2 and 2' in FIG. 4, and the curves 1 and 2 in FIG. 5, the efficiency of optical recharging of the optical energy rechargeable type half-cell is very high, and the discharging characteristic thereof after recharging is substantially equivalent to the first discharging characteristic.

After a second discharging (for 1.5 hours), the above-described optical recharging and discharge were repeated several times to investigate the relation between discharging current and output voltage and the relation between discharging current and discharging time. The characteristics of these relations were similar to those of the first discharging. It was found that the efficiency of the optical reproduction is not lowered even if the optical recharging is repeatedly carried out.

What is claimed is:

1. An optical-charging/rechargeable type half cell comprising: a metal electrode with a lead wire, and a thin plate of photoactive-semiconductor material in contact with said metal electrode, an auxiliary metal electrode in contact with said thin plate and said metal electrode, said metal electrode and thin plate being immersed in a liquid electrolyte containing metal ions from which metal is deposited on the surface of said photoactive-semiconductor material by reduction of metal ions upon exposure to said photoactive-semiconductor material to light, said auxiliary electrode being selected from metals having an iomization potential equal to or greater than that of said metal ions in said electrolyte.

2. The device of claim 1 further comprising an oxidation-reduction system half-cell, said oxidation-reduction half cell and optical type half-cell being connected to each other through a material bridging said half cell prohibiting fluid exchange but which does not interrupt the movement of ions therebetween.

3. The device of claims 1 or 2 wherein said thin plate is a single crystal of semiconductor.

4. The device of claims 1 or 2 wherein said thin plate is a ribbon shaped crystal of semiconductor.

5. The device of claims 1 or 2 wherein said thin plate comprises powdered semiconductor molded under pressure and then sintered.

6. The device of claims 1 or 2 wherein said thin plate is powdered semiconductor dispersed in a binding agent.

7. The device of claims 1 or 2 wherein said semiconductor material is selected from the group consisting of n-type oxides of $TiO_2$, $ZnO$, $SnO_2$, $V_2O_5$, $Fe_2O_3$, $SrTiO_3$, $CaTiO_3$, $CdS$, $SiC$, $GaP$, $GaAs$, $CdSe$ and $CdTe$.

8. The device of claims 1 or 2 wherein said metal electrode is selected from the group consisting of Au, Ag, Cu, Pb, Sn, Ni, Co, In, Cd, Fe, Ga, Cr, Zn, Mn, Zr, Ti and Al.

9. The device of claims 1 or 2 further comprising a cover surrounding said metal electrode.

10. The device of claim 9 wherein said cover surrounds said thin plate and said metal electrode.

11. The device of claim 2 wherein said oxidation-reduction half-cell comprises an electrode and an electrolyte comprising an oxidation-reduction couple.

12. The device of claims 2 or 11 wherein said material not interrupting the flow of ions is selected from the group consisting of a salt bridge, a porous chip, a glass frit, or an ion exchange membrane.

13. The device of claim 11 wherein said electrode in said oxidation-reduction half-cell is selected from the group consisting of Pt, Ag and C.

* * * * *